United States Patent
Namuduri et al.

(10) Patent No.: US 6,390,252 B1
(45) Date of Patent: May 21, 2002

(54) MAGNETORHEOLOGICAL FLUID DAMPER WITH OPTIMUM DAMPING

(75) Inventors: Chandra Sekhar Namuduri, Sterling Heights, MI (US); Alexander Apostolos Alexandridis, Kronberg (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/397,241

(22) Filed: Sep. 16, 1999

Related U.S. Application Data

(63) Continuation-in-part of application No. 09/394,487, filed on Sep. 13, 1999, now abandoned.

(51) Int. Cl.$^7$ .................................................. F16F 9/53
(52) U.S. Cl. ............... 188/267.2; 188/267; 188/322.15; 188/322.22
(58) Field of Search ............................ 188/267, 267.1, 188/267.2, 269, 322.15, 322.22

(56) References Cited

U.S. PATENT DOCUMENTS

| | | |
|---|---|---|
| 2,661,596 A | 12/1953 | Winslow |
| 3,207,269 A | 9/1965 | Klass |
| 5,277,281 A | 1/1994 | Carlson et al. ........... 188/267.1 |
| 5,632,361 A | 5/1997 | Wulff et al. .............. 188/267.1 |
| 5,878,851 A | 3/1999 | Carlson et al. ........... 188/267.1 |
| 6,095,486 A * | 8/2000 | Ivers et al. ................. 188/267 |
| 6,131,709 A * | 10/2000 | Jolly et al. ................ 188/267.2 |

FOREIGN PATENT DOCUMENTS

| | | |
|---|---|---|
| WO | 98/00653 | 1/1998 |

OTHER PUBLICATIONS

W.I. Kordonsky, "Magnetorheological effect as a base of new devices and technologies", Journal of Magnetism and Magnetic Materials, 1993.
Carrera Racing Shocks' advertisement for MagneShock, MagneShock Scores First Race Win!, Jun., 1999.

* cited by examiner

*Primary Examiner*—Pam Rodriguez
(74) *Attorney, Agent, or Firm*—Robert M. Sigler

(57) ABSTRACT

An improved magnetorheological fluid damper is provided which more closely approximates ideal performance requirements including increased turn-up ratio and stiction free performance near zero velocity for realistic automotive applications. The MR damper includes a magnetic flux leakage reduction device positioned at each end of the magnetic damper piston assembly to create a magnetic flux isolation barrier causing magnetic flux to extend through an annular flow gap thereby minimizing flux leakage into other areas such as a piston rod and associated hollow tube. The magnetic flux leakage reduction devices are formed of a non-magnetic material and completely cover a respective adjacent axial face of a piston core. A laminar flow enhancing feature is also provided for enhancing laminar flow and minimizing turbulence in the annular flow gap thereby advantageously reducing the off-state force and increasing the turn-up ratio.

22 Claims, 3 Drawing Sheets

MAGNETORHEOLOGICAL FLUID DAMPER WITH OPTIMUM DAMPING

PRIOR REFERENCED APPLICATION

This is a Continuation-in Part of Ser. No. 09/394,487, filed Sep. 13, 1999, now abandoned.

TECHNICAL FIELD

The present invention relates generally to damping devices used in controlled damping applications such as semi-active vehicle suspension systems. More particularly, the present invention relates to high performance controlled damping devices using magnetorheological (MR) fluid.

BACKGROUND OF THE INVENTION

High performance controlled damping applications, such as those used in passenger vehicle suspension systems, preferably provide a relatively low damping force at low speeds for comfort, and provide relatively high damping force at high speeds for safe handling of the vehicle.

One known semi-active suspension was introduced on General Motors cars and used continuously variable real-time damping (CV-RTD) actuators. The CV-RTD was based on pulse width modulation (PWM) of a two-stage pressure control valve that produces a desired damping force by using an electromagnetic solenoid to continuously modulate an armature plate. This actuator requires a triple tube construction and a complex valve design that results in a relatively expensive system that is rather sensitive to manufacturing tolerance. Previous analysis and test data showed that the stiffness of the deflective disk plays a key role in determining the dynamic stability of the CV-RTD valve. It was also not possible to achieve high frequency wheel control with the current CV-RTD based suspension system. It would be desirable to develop cost effective, high performance and robust RTD actuators using, for example, smart fluids (e.g., Electrorheological (ER) and Magnetorheological (MR) fluids) with controllable rheology and fixed flow area instead of moving mechanical valves with variable flow area. ER fluids require very high electrical fields (on the order of 5 kV/mm i.e., Kilovolt/milimeter) to produce the desired effects, whereas MR fluids produce similar effects at voltages well below 12V and hence are preferred for automotive use.

Magnetorheological (MR) fluids consist of magnetizable microparticles (e.g., iron and/or iron alloy powders) suspended in an inert base fluid (e.g., synthetic oil). MR fluids exhibit Newtonian Flow characteristics, with negligible yield stress, when there is no external magnetic field. However, the yield stress of a MR fluid can be increased by several orders of magnitude by subjecting it to a magnetic field perpendicular to the flow direction. This Bingham plastic behavior of MR fluid in the "on" state is advantageous in creating actuators with controllable force or torque such as vibration dampers and clutches, without using any moving valves. MR fluids, and devices using the MR fluids, are well known. However, earlier problems with sedimentation and abrasion discouraged their use. Recent advances in material technology and electronics have renewed the interest in MR fluids for applications in smart actuators for fast and efficient control of force, e.g. damping, or torque in a mechanical system.

The damping performance of a MR fluid based CV-RTD damper is largely dependent on the force-velocity characteristics of the damper. FIG. 1 illustrates the optimum force-velocity characteristics of a damper used in automotive applications. The slope of the off-state force-velocity curve should be as low as possible for a smooth ride, with a desirable value of approximately 600 N-s/m(Newton-second/meter). The on-state force-velocity curve preferably has an initial slope in the range of 5–30 kN-s/m (KiloNewton-second/meter) up to a velocity of 0.1 to 0.4 m/s(meter/second) and a final slope similar to that in the off-state. The desirable maximum on-force should be limited to a suitable value (e.g., 4500N) at 2 m/s. The ratio of the damping force when the damper is in the on-state (on-force) to the damping force when the damper is in the off-state (off-force) at a given velocity is known as the turn-up ratio. It is desirable to have a turn-up ratio of at least 3 to 6 at a velocity of 1 m/s for good control of the vehicle chassis dynamics.

FIG. 2 shows a known monotube MR damper 10 having a piston 12 sliding within a hollow tube 14 filled with MR fluid. The piston 12 is attached to a hollow rod 18 that slides within a sealed bearing 20 at one end of the body of the damper 10. The piston 12 contains a coil 22, which carries a variable current, thus generating a variable magnetic field across a flow gap 24 between an inner core 26 and an outer shell or flux ring 28 of the piston 12. A bearing 30 having relatively low friction is disposed between the flux ring 28 and the tube 14. The flux ring 28 and the inner core 26 of the piston 12 are held in place by spoked end plates 32. Terminals 34 of the coil 22 extend through the hollow rod 18 and are provided with suitable insulation for connection to a source of electricity. One end 36 of the tube 14 is filled with inert gas which is separated from the MR fluid by a floating piston 38. The floating piston 38 and inert gas 36 accommodate the varying rod volume during movement of the piston. U.S. Pat. No. 5,277,281 discloses a similar MR damper.

FIG. 3 illustrates the force-velocity characteristics of the type of MR damper disclosed in FIG. 2. Clearly, in comparison to the preferred curves of FIG. 1, improvements in the force-velocity characteristics of conventional MR dampers are desirable. Although the above-described conventional MR dampers may perform adequately in certain applications, these devices do not achieve the required turn-up ratio and substantially stiction free performance near zero velocity for realistic automotive applications. For example, the conventional dampers often permit excessive flux leakage from the piston core into the piston rod and the cylinder disadvantageously reducing the average flux density, and creating an asymmetric distribution of flux in the flow gap, resulting in decreased performance and increased power requirements. Also, many conventional dampers create excessive turbulence in the flow of fluid through the flow gap thus decreasing damping performance. Therefore, there is a need for a more compact MR damper capable of more effectively and controllably damping motion.

SUMMARY OF THE INVENTION

The present invention is aimed at developing an MR fluid based continuously variable real-time damper that best approximates ideal performance requirements, while minimizing the damper size and power requirements.

This and other objects are achieved by providing a damping device comprising a hollow tube containing a magnetorheological fluid and a piston assembly slidably mounted in the hollow tube to form a first chamber positioned on one side of the piston assembly and a second chamber positioned on an opposite side of the piston assembly. The piston assembly includes a piston core, a substantially annular flow gap extending between the first and the second chambers and defining a flow path through the piston assembly, and a magnetic assembly adapted to generate a magnetic field extending across the substantially annular flow gap. The flow gap includes a first end positioned adjacent the first chamber and a second end positioned adjacent the second chamber. A laminar flow enhancing feature or means is mounted on the piston assembly and positioned adjacent the first and the second ends of the annular flow gap for enhancing laminar flow and minimizing turbulence in the annular flow gap. The laminar flow enhancing feature may include a respective flow opening positioned adjacent each of the first and second ends of the substantially annular flow gap. The respective flow opening has a funnel-shaped cross-section defined by an outer annular curved surface extending outwardly from the substantially annular flow gap toward the hollow tube and an inner annular curved surface extending inwardly from the substantially annular flow gap toward a longitudinal axis of the piston core.

The present invention is also directed to a damping device including a hollow tube, a piston assembly comprised of the piston core, substantially annular flow gap and magnet assembly as described herein above, and further including first and second magnetic flux leakage reduction devices formed of a non-magnetic material and positioned adjacent the first and second ends, respectively, of the flow gap. Each of the magnetic flux leakage reduction devices are positioned adjacent the substantially annular flow gap and securely connected to the piston core. The first magnetic flux leakage reduction device may include a first end plate while the second magnetic flux leakage reduction device may include a second end plate wherein the first end plate is connected to the piston core by a brazed connection. The damping device may further include a rod connected to the first end plate wherein the first end plate is positioned between the rod and the piston core to position the rod a spaced distance from the piston core. The rod and the hollow tube are preferably formed of a non-magnetic material. A piston bearing may be provided on the piston assembly between the outer surface and the hollow tube. The piston bearing is preferably positioned axially along the piston assembly entirely between an axial center of the piston core and one of the first and second chambers. The non-magnetic end plates may each include the inner annular curved surface while a flux ring positioned radially between the substantially annular flow gap and the hollow tube may include the outer annular curved surface. The non-magnetic end plates may be formed of either stainless steel or hardened aluminum. The non-magnetic end plate may include a flat plate and a non-magnetic nut secured to said piston core wherein the non-magnetic nut extends axially beyond an axial extent of the piston core. Flow bypass channels may be formed in both the piston core and the flux ring.

DETAILED DESCRIPTION OF THE PREFERRED EMBODIMENT

Figure 4:
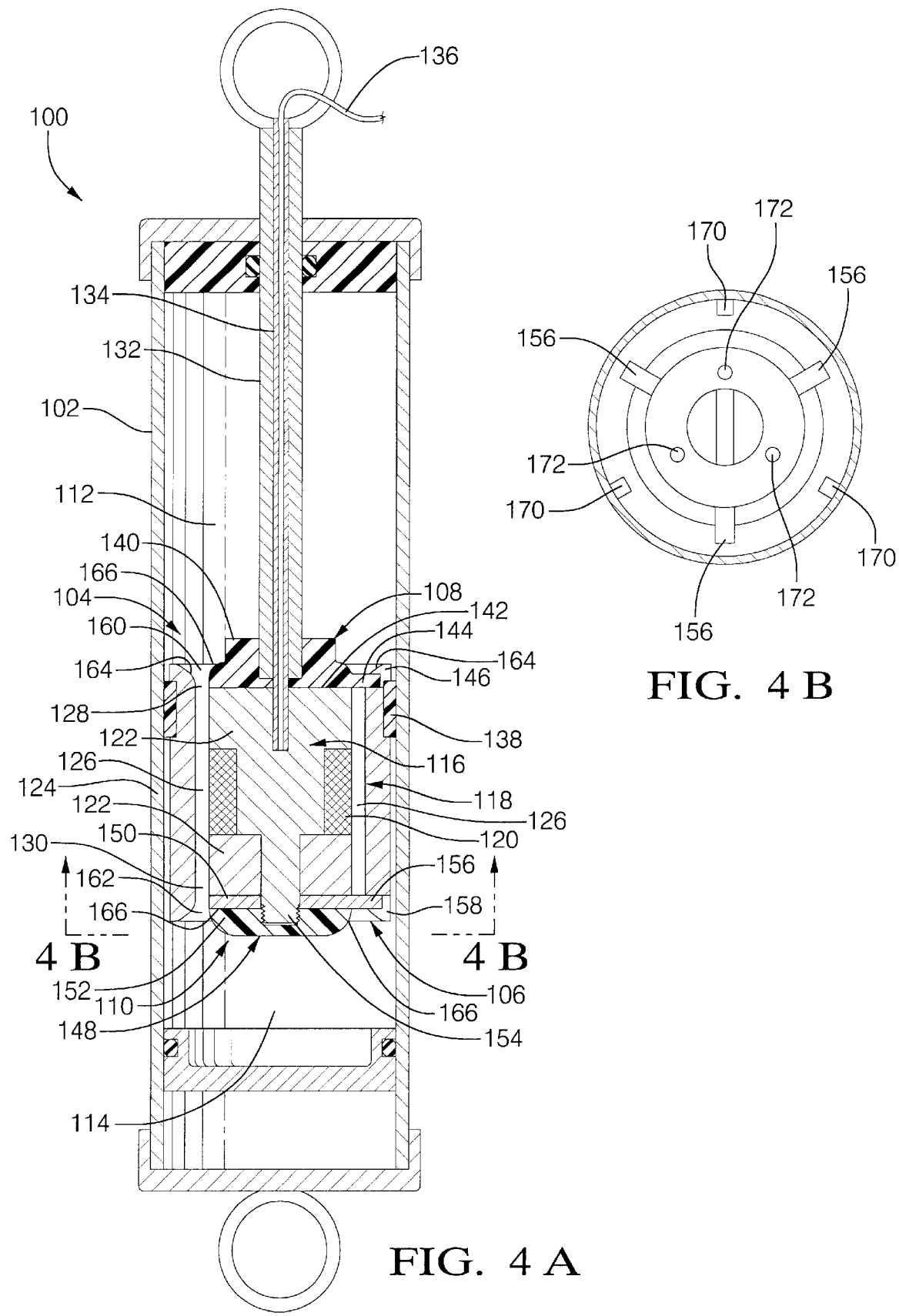
FIG. 4A is a cross-sectional side view of the MR damper of the present invention.
FIG. 4B is a end view of the piston assembly of the MR damper of FIG. 4A.

Referring to FIGS. 4A and 4B, there is shown a magnetorheological fluid damper of the present invention indicated generally at 100, designed to effectively provide enhanced damping performance over an extended dynamic range. Damper 100 includes a hollow tube 102 containing magnetorheological fluid, a piston assembly 104 slidably mounted for reciprocal movement in hollow tube 102, at least one of a laminar flow enhancing feature 106 for enhancing laminar flow and minimizing turbulence through the piston assembly, and first and second magnetic flux leakage reduction devices 108 and 110, respectively, for minimizing flux leakage from the ends of piston assembly 104.

Referring to FIG. 4A, piston assembly 104 divides hollow tube 102 into a first chamber 112 positioned on one side of piston assembly 104 and a second chamber 114 positioned within hollow tube 102 on an opposite side of piston assembly 104. Piston assembly 104 includes a piston core 116 and a magnet assembly 118. Magnet assembly 118 includes a coil 120 mounted on a central portion of piston core 116, flux pole pieces 122 formed by piston core 116 on both sides of coil 120 and an annular flux ring 124 extending around the circumference of piston core 116. Piston assembly 104 also includes a substantially annular flow gap 126 positioned between flux ring 124 and piston core 116. Substantially annular flow gap 126 extends axially through piston assembly 104 and includes a first end 128 positioned adjacent first chamber 112 and a second end 130 positioned adjacent second chamber 114.

Magnetorheological damper 100 also includes a cylindrical rod 132 operatively connected to piston assembly 104 for transmitting axial forces to piston assembly 104. Rod 132 also includes a central bore 134 containing electrical leads 136 for delivering electrical power to coil 120. A piston bearing 138 is mounted on an outer annular surface of piston assembly 104 for permitting smooth sliding contact along hollow tube 102 while creating a fluidic seal between first chamber 112 and second chamber 114.

First magnetic flux leakage reduction device 108 and second magnetic flux leakage reduction device 110 both function to secure flux ring 124 in a fixed axial and transverse position relative to piston core 116 so as to prevent relative movement between flux ring 124 and core 116 thereby maintaining a desired transverse width, i.e., radial length $L_g$ (see Eq. (1) hereinbelow), of substantially annular flow gap 126. As shown in FIG. 4A, first magnetic flux leakage reduction device 108 includes a first end plate 140 rigidly connected to piston core 116 by, for example, brazing or welding to form a brazed or welded connection 142. First end plate 140 also comprises one axial end of a radially central portion of piston assembly 110 further comprising flux pole pieces 122 and coil 120 of piston core 116 in this embodiment and a second end plate 148 at the opposite axial end. The radially central portion of piston assembly 110 and the annular flux ring 124 have opposing surfaces defining annular flow gap 126 therebetween. First magnetic flux leakage reduction device 108 also includes a plurality of radial extensions 144 extending from first end plate 140 radially outward into a complementary groove 146 formed in one end of flux ring 124. Second magnetic flux leakage reduction device 110 includes the second end plate 148 comprised of a flat plate 150 and a threadable nut 152 for engaging a threaded boss 154 extending from piston core 116. Nut 152 is formed from a non-magnetic material and threadably engages boss 154 to secure flat plate 150 to piston core 116. Flat plate 150 also includes radial extensions 156 as shown in FIGS. 4A and 4B for engaging complementary grooves 158 formed in flux ring 124. In this manner, first and second magnetic flux leakage reduction devices 108 and 110 securely position flux ring 124 on piston core 116 to form substantially annular flow gap 126.

Fundamentally, during damping, magnetorheological fluid present in one of the chambers of hollow tube 102 flows through substantially annular flow gap 126 from, for example, second chamber 114 to first chamber 112 as piston assembly 104 moves to the left as shown in FIG. 4A. The magnetorheological fluid may be any conventional fluid including magnetic particles, such as iron or iron alloys, which can be controllably suspended within the fluid by controlling a magnetic field across flow gap 126 thereby varying the flow characteristics of the fluid through flow gap 126. The electrical current to coil 120 is variably controlled to vary the magnetic field and thus the magnetic flux in flow gap 126 thereby controlling the flow characteristics of the magnetorheological fluid to achieve a desired damping effect for a given application.

Laminar flow enhancing feature 106, first magnetic flux leakage reduction device 108 and second magnetic flux leakage reduction device 110 each function independently, and in combination with each other and/or other features of the present invention, to provide improved force-velocity damping characteristics and an increased turn-up ratio thereby optimizing damping and providing exceptional control of, for example, vehicle chassis dynamics. The MR damper of the present invention approximates the ideal performance and force-velocity characteristics shown in FIG. 1. Conventional MR damper designs assumed that the force generated in an MR damper in the off-state are strictly linear with velocity. However, this assumption is incorrect, especially at high damper velocities. It has been discovered that the off-state force ($F_{off}$) generated in a MR damper having concentric annular flow is given by:

$$F_{off}=(12\,\mu_0 A_{eff}^2 V_d h)/(A_g L_g^2)+x\,A_f(A_f-1)A_{eff}\rho V_d^y \quad (1)$$

where, $\mu_0$=MR Fluid viscosity $A_{eff}$=Effective cross sectional area of the piston (i.e., piston area-rod area)

$V_d$=damper velocity h=axial length of the annular flow gap $A_g$=cross sectional area of the annular flow gap $L_g$=radial length of the annular flow gap ($r_2-r_1$)

r=mean radius of the annular flow gap ($r_2+r_1$)/2

$r_2$=outer radius of the annular flow gap $r_1$=inner radius of the annular flow gap $A_f$=Amplification factor ($A_{eff}/A_g$)

$\rho$=density of the MR fluid x=dynamic flow coefficient (0<x<1.5)

y=dynamic flow coefficient (0<y<2.5)

The initial on-state force ($F_{init}$) at zero velocity is dependent on the yield stress of the MR fluid which in turn depends on the magnetic flux density in the annular flow gap. The initial on-state force is given by:

$$F_{init}=(2\tau_0 A_{eff} h_m)/(L_g) \quad (2)$$

where, $\tau 0$=MR Fluid yield stress (function of an operating flux density $B_g$)

$A_{eff}$=Effective cross sectional area of the piston (i.e., piston area-rod area)

$h_m$=active magnetic length of the annular flow gap $L_g$=radial length of the annular flow gap ($r_2-r_1$)

The total on-state force ($F_{on}$) at higher piston velocities $V_d$ can be approximated by:

$$F_{on}=F_{init}+F_{off} \quad (3)$$

From equations (1) and (3), the turn-up ratio (TU) at velocity $V_d$ is given by:

$$TU=(F_{init}/F_{off})+1 \quad (4)$$

Thus a larger turn-up ratio can be achieved with a reduction in $F_{off}$ and/or improving/increasing $F_{init}$.

First and second magnetic flux leakage reduction devices 108 and 110, respectively, effectively improve and increase the initial on-state force ($F_{init}$) by maximizing the active magnetic flux in substantially annular flow gap 126 in several ways. First magnetic flux leakage reduction device 108 maximizes the magnetic field in annular flow gap 126 by minimizing leakage flux and thereby increasing both $F_{init}$ and therefore the total on-state force $F_{on}$, by functioning as a magnetic isolation barrier between piston core 116 and both rod 132 and hollow tube 102. It has been discovered by analysis of the magnetic field that significant leakage of the magnetic flux occurs from the sides of the piston core through the rod of conventional dampers with the return path being the tube. This flux leakage has two significant effects: an asymmetric distribution of the flux density and a net reduction in the average flux density in the flow gap. Also, the leakage causes the piston core to saturate due to the additional flux necessary to compensate for the leakage. First magnetic flux leakage reduction device 108 minimizes flux leakage from the outer sides of piston core 116 into rod 132 and tube 102 by being formed of a non-magnetic material, such a stainless steel. Also, importantly, first end plate 140 of first magnetic flux leakage reduction device 108 extends transversely across piston core 116 so as to be positioned axially between the inner end of rod 132 and piston core 116 to isolate and position rod 132 a spaced axial distance from piston core 116. Consequently, flux leakage from piston core 116 into rod 132 is greatly diminished since non-magnetic first end plate 140 functions as a barrier directing the lines of flux in the appropriate path for passage through substantially annular flow gap 126. Thus, rod 132 is rigidly connected to first end plate 140 instead of piston core 116, by, for example, a threaded connection. In addition, as a result, first end plate 140 extends over the entire outer axial face of piston core 116 to completely cover the axial face from exposure to the MR fluid thereby enhancing the reduction of flux leakage. First end plate 140 is formed with a sufficient axial extent or thickness of non-magnetic material, preferably 1–5 mm, to create a sufficient isolation barrier along the complete radial extent of the axial face of piston core 116. First magnetic flux reduction device 108 also effectively increases the on-state force by maximizing the volume of piston core 116 available for magnetic flux production. Specifically, since rod 132 does not extend into and connect to piston core 116, piston core 116 does not include a counter bore for receiving rod 132 and thus includes more magnetic material for flux production. First magnetic flux leakage reduction device 108 achieves this design by using a brazed connection 142 between first end plate 140 and piston core 116 while rigidly connecting rod 132 to first end plate 140 without requiring connection of the rod to piston core 116. Also, preferably rod 132 and hollow tube 102 are formed from a non-magnetic material, such as stainless steel or hardened aluminum, thereby further minimizing flux leakage.

Figure 2:
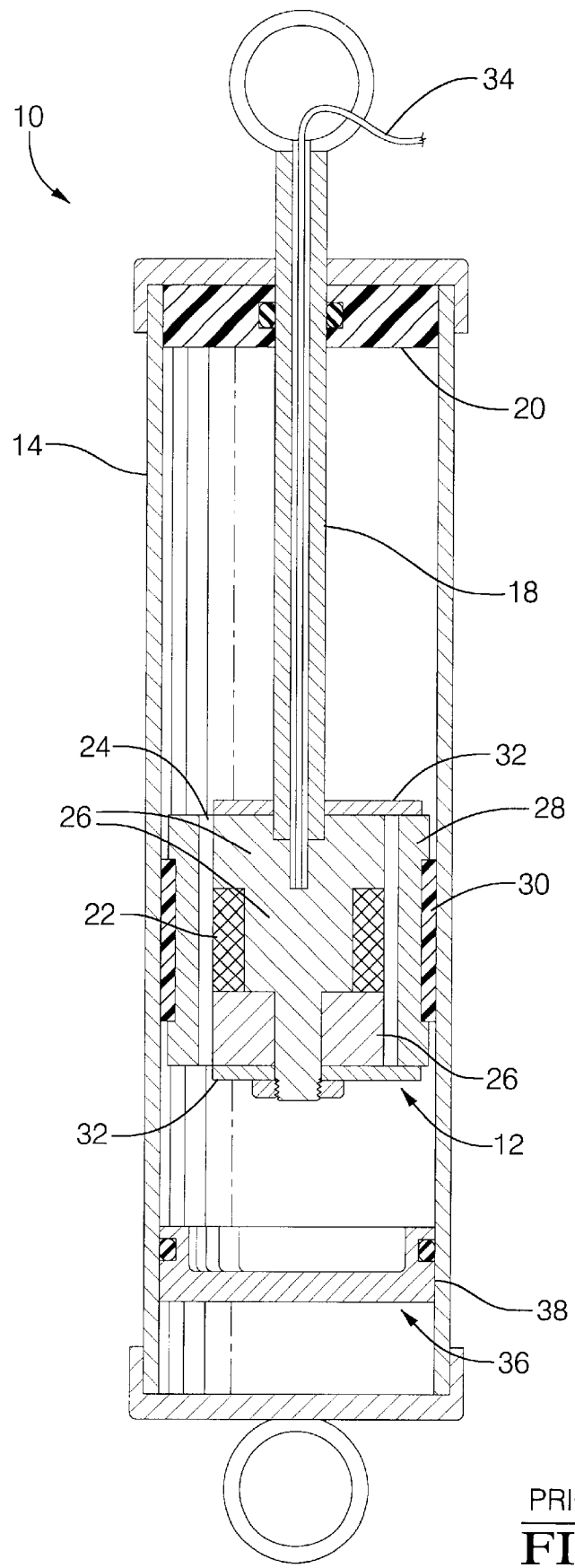
FIG. 2 is a cross-sectional view of a conventional MR damper.

Second magnetic flux leakage reduction device 110 also effectively minimizes flux leakage from the opposite end of piston core 116 by utilizing nut 152 formed of a non-magnetic material, such as stainless steel or hardened aluminum, to attach flat plate 152 to piston core 116. Flat plate 150 is also preferably formed of a non-magnetic material. Non-magnetic nut 152 also contains a sufficient axial extent or thickness, preferably 1–5 mm, to form a sufficient magnetic isolation barrier preventing flux leakage from the outer end of piston core 116. As can be seen in FIG. 4A, non-magnetic nut 152 extends axially beyond an axial extent of boss 154 of piston core 116 and radially over the entire outer axial face of piston core 116 to completely cover the axial face from exposure to the MR fluid thereby minimizing flux leakage. The use of first and second magnetic flux leakage reduction devices 108 and 110 enable the MR damper of the present invention to improve the initial on-state force $F_{init}$ by 20% as compared with to the conventional design of FIG. 2.

The active magnetic flux is also maximized and thus $F_{init}$ increased by strategically positioning bearing 138. Specifically, bearing 138 is mounted on flux ring 124 so as to maximize the primary magnetic area in the center of flux ring 124 where the flux is concentrated. Preferably, as shown in FIG. 4A, bearing 138 is positioned at one end of flux ring 124 axially along piston assembly 104 entirely between an axial center of piston core 116 and first chamber 112. However, alternatively, bearing 138 may be positioned to the left of center as shown in FIG. 4A. In either offset position, the primary magnetic area of flux ring 124 is maximized to increase magnetic flux and ultimately the turn-up ratio.

The MR damper of the present invention also results in a larger turn-up ratio due to a reduction in the off-state force $F_{off}$ by utilizing laminar flow enhancing feature 106. First, it was recognized that the reduction in the off-state force can be achieved by positively affecting fluid flow through the piston assembly 104 so as to minimize the flow coefficients X and Y in equation (1). It was determined by computational fluid dynamic studies that enhancing the laminar flow and minimizing turbulence in annular flow gap 126 would effectively minimize the flow coefficients X and Y. Laminar flow enhancing feature 106 effectively enhances laminar flow and minimizes turbulence by forming an annular flow opening 160 adjacent first end 128 of annular flow gap 126 and an annular flow opening 162 adjacent second end 130 of annular flow gap 126. Each flow opening 160, 162 has a funnel-shaped cross-section as shown in FIG. 4A which enhances laminar flow through flow gap 126. Each flow opening 160, 162 is defined by an outer annular curved surface 164 on annular ring 124 extending outwardly from annular flow gap 126 toward hollow tube 102 and an inner annular curved surface 166 on the radially central portion of piston assembly 110 extending inwardly from annular flow gap toward the longitudinal axis of piston core 116. In the preferred embodiment as shown in FIG. 4A, outer annular curved surfaces 164 are formed on each end of flux ring 124. Inner annular curved surfaces 166 are formed on first end plate 140 and on second end plate 148. Inner annular curved surface 166 positioned adjacent the second end 130 of flow gap 126 is specifically formed on non-magnetic nut 152. Outer and inner annular curved surfaces 164, 166 preferably include a radius of curvature sized so that the ratio of the radius of curvature to the radial length of the flow gap ($L_g$) is in the range of 1–5 to provide significant reductions in the off-state force. During operation, flow openings 160 and 162 function to smoothly guide fluid into and out of annular flow gap 126 thereby minimizing turbulence and enhancing laminar flow through annular flow gap 126. Also, radial extensions 144 and 156, extending across flow openings 160 and 162, are formed with a narrow annular extent to minimize the cross-sectional flow area of flow gap 126 blocked by radial extensions 144 and 156 thereby maximizing the effective cross-sectional flow area. Radial extensions 144 and 156 also have a substantial axial thickness in comparison to conventional designs so as to provide sufficient structural support to the piston assembly 104. The combination of utilizing laminar flow enhancing feature 106 including curved funnel-shaped flow openings 160 and 162 and minimizing the flow area obstruction by radial extensions 144 reduces the off-state force $F_{off}$ by at least 20% in comparison to the conventional design of FIG. 2.

Figure 1:
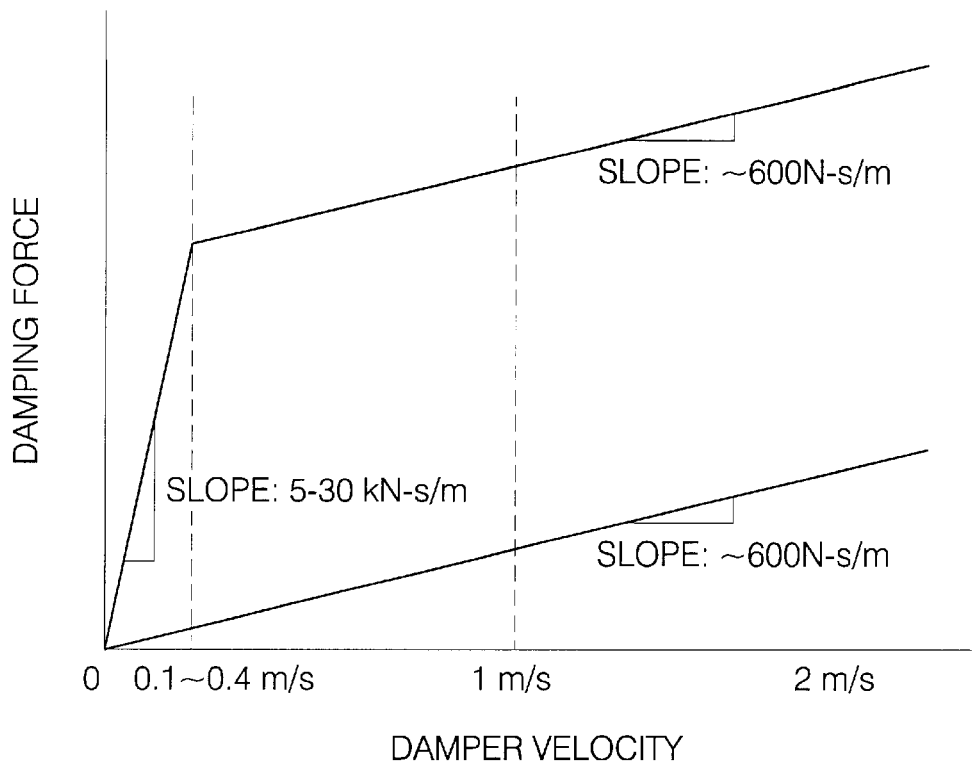
FIG. 1 is a graph showing the relationship between damping force and damper velocity for an ideal MR damper in an automotive application.
Figure 3:
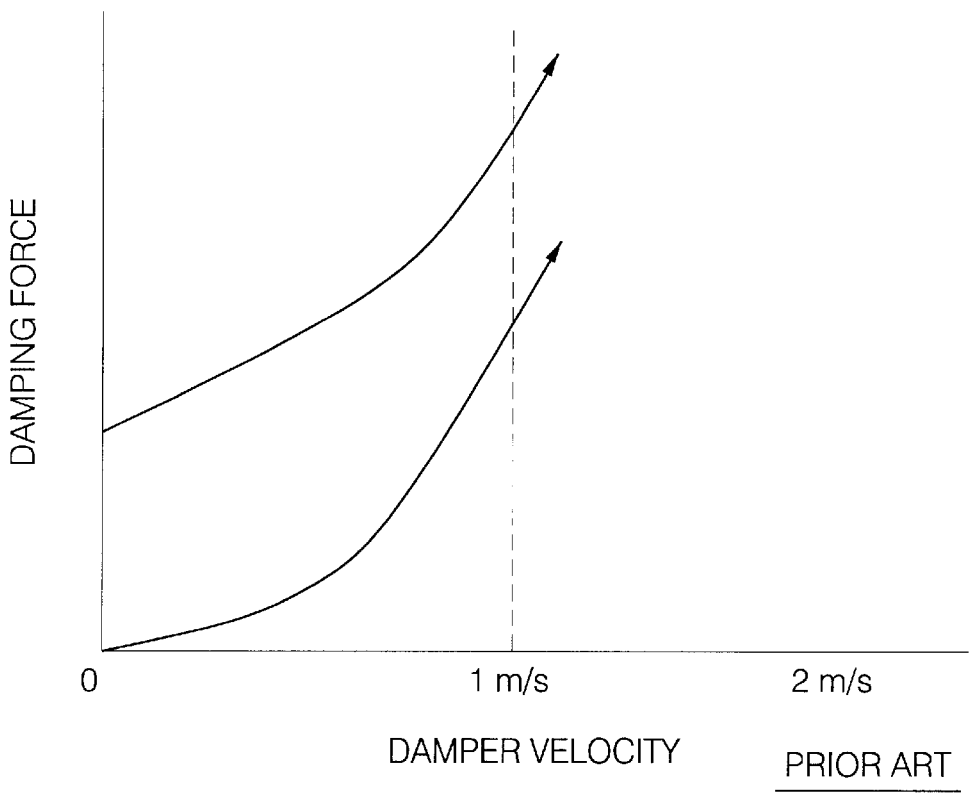
FIG. 3 is a graph of the relationship between damper force and damper velocity for the conventional MR damper of FIG. 2.

Another objective of the present invention is to achieve optimized damping behavior near zero velocity as indicated in FIG. 1 thereby achieving stiction free behavior in the on-state to minimize harshness. This goal is achieved by forcing the force-velocity on-state curve to pass through zero. A linear force-velocity curve passing through zero is achieved by using laminar flow of the MR fluid through magnetically substantially neutral flow bypass channels extending through piston assembly 104. The initial slope of the force-velocity curve of FIG. 1 is controlled by appropriately selecting the cross-sectional area of the bypass channels. For example, as shown in FIG. 4B, the bypass channels may include at least one of, and preferably all, multiple outer flow bypass channels 170 formed in flux ring 124 and inner flow bypass channels 172 formed in piston core 116 and end plates 140 and 148. Outer flow bypass channels 170 may be formed with a square or rectangular cross-section while inner flow bypass channels 172 may be formed with round or oval cross-section shapes. Thus, in the on-state, for initial velocities, the flow is substantially through the bypass channels 170, 172 with a zero velocity resulting in zero force. As the velocity increases substantially above zero, the pressure drop across the bypass channels exceeds the pressure drop due to the magnetorheological effect in annular flow gap 126 so that subsequent force characteristics depend on the magnetorheological characteristics through the flow gap.

What is claimed is:
1. A damping device, comprising:
a hollow tube containing a magnetorheological fluid,
a piston assembly slidably mounted in said hollow tube to form a first chamber positioned on one side of said piston assembly and a second chamber positioned on an opposite side of said piston assembly, said piston assembly including a radially central portion and an annular ring radially surrounding the radially central portion and defining therebetween a substantially annular flow gap extending between said first and said second chambers and defining a flow path through the piston assembly, and a magnet assembly adapted to generate a magnetic field extending across said substantially annular flow gap, said radially central portion, said annular ring and said substantially annular flow gap each including a first end positioned adjacent said first chamber and a second end positioned adjacent said second chamber; and laminar flow enhancing means mounted on said piston assembly and positioned adjacent said first and said second ends of said substantially annular flow gap for enhancing laminar flow and minimizing turbulence in said substantially annular flow gap, wherein said laminar flow enhancing means includes a respective flow opening . positioned adjacent each of said first and said second ends of said substantially annular flow gap, said respective flow opening having a funnel-shaped cross-section defined by an outer annular curved surface on the respective axial end of the annular ring extending outwardly from said substantially annular flow gap toward said hollow tube and an inner annular curved surface on the respective end of the radially central portion extending inwardly from said substantially annular flow gap toward a longitudinal axis of said piston core.

2. The damping device of claim 1, wherein said piston assembly further includes at least one non-magnetic end plate.

3. The damping device of claim 2, wherein said at least one non-magnetic end plate is made of one of stainless steel and hardened aluminum.

4. The damping device of claim 2, wherein said at least one non-magnetic end plate is secured to the piston by one of a brazed and welded connection.

5. The damping device of claim 1, wherein said hollow tube is made of a non-magnetic material.

6. The damping device of claim 1 wherein the inner annular curved surface is formed at least on an end plate comprising one axial end of the piston assembly.

7. A damping device, comprising:

a hollow tube containing a magnetorheological fluid;

a piston assembly slidably mounted in said hollow tube to form a first chamber positioned on one side of said piston assembly and a second chamber positioned on an opposite side of said piston assembly, said piston assembly including a piston core, a substantially annular flow gap extending between said first and said second chambers and defining a flow path through the piston assembly, and a magnet assembly adapted to generate a magnetic field extending across said substantially annular flow gap, said substantially annular flow gap including a first end positioned adjacent said first chamber and a second end positioned adjacent said second chamber;

laminar flow enhancing means mounted on said piston assembly and positioned adjacent said first and said second ends of said substantially annular flow gap for enhancing laminar flow and minimizing turbulence in said substantially annular flow gap, said laminar flow enhancing means including a respective flow opening positioned adjacent each of said first and said second ends of said substantially annular flow gap, said respective flow opening having a funnel-shaped cross-section defined by an outer annular curved surface extending outwardly from said substantially annular flow gap toward said hollow tube and an inner annular curved surface extending inwardly from said substantially annular flow gap toward a longitudinal axis of said piston core; and a first end plate secured to one end of said piston core and a second end plate secured to a second end of said piston core, said first and said second end plates each including said inner annular curved surface.

8. A damping device, comprising:

a hollow tube containing a magnetorheological fluid;

a piston assembly slidably mounted in said hollow tube to form a first chamber positioned on one side of said piston assembly and a second chamber positioned on an opposite side of said piston assembly, said piston assembly including a piston core, a substantially annular flow gap extending between said first and said second chambers and defining a flow path through the piston assembly, and a magnet assembly adapted to generate a magnetic field extending across said substantially annular flow gap, said substantially annular flow gap including a first end positioned adjacent said first chamber and a second end positioned adjacent said second chamber;

laminar flow enhancing means mounted on said piston assembly and positioned adjacent said first and said second ends of said substantially annular flow gap for enhancing laminar flow and minimizing turbulence in said substantially annular flow gap, said laminar flow enhancing means including a respective flow opening positioned adjacent each of said first and said second ends of said substantially annular flow gap, said respective flow opening having a funnel-shaped cross-section defined by an outer annular curved surface extending outwardly from said substantially annular flow gap toward said hollow tube and an inner annular curved surface extending inwardly from said substantially annular flow gap toward a longitudinal axis of said piston core; and a flux ring positioned radially between said substantially annular flow gap and said hollow tube, said outer annular curved surface being formed on said flux ring.

9. A damping device, comprising:

a hollow tube containing a magnetorheological fluid;

a piston assembly slidably mounted in said hollow tube to form a first chamber positioned on one side of said piston assembly and a second chamber positioned on an opposite side of said piston assembly, said piston assembly including a piston core, a substantially annular flow gap extending between said first and said second chambers and defining a flow path through the piston assembly, and a magnet assembly adapted to generate a magnetic field extending across said substantially annular flow gap, said substantially annular flow gap including a first end positioned adjacent said first chamber and a second end positioned adjacent said second chamber;

laminar flow enhancing means mounted on said piston assembly and positioned adjacent said first and said second ends of said substantially annular flow gap for enhancing laminar flow and minimizing turbulence in said substantially annular flow gap, said laminar flow enhancing means including a respective flow opening positioned adjacent each of said first and said second ends of said substantially annular flow gap, said respective flow opening having a funnel-shaped cross-section defined by an outer annular curved surface extending outwardly from said substantially annular flow gap toward said hollow tube and an inner annular curved surface extending inwardly from said substantially annular flow gap toward a longitudinal axis of said piston core; and at least one non-magnetic end plate including a flat plate and a non-magnetic nut secured to said piston core, said non-magnetic nut extending axially beyond an axial extent of said piston core, said flat plate and said non-magnetic nut completely covering an outer axial face of said piston core.

10. The damping device of claim 9, wherein said non-magnetic nut includes at least a portion of said inner annular curved surface.

11. A damping device, comprising:
a hollow tube containing a magnetorheological fluid;
a piston assembly slidably mounted in said hollow tube to form a first chamber positioned on one side of said piston assembly and a second chamber positioned on an opposite side of said piston assembly, said piston assembly including a piston core, a substantially annular flow gap extending between said first and said second chambers and defining a flow path through the piston assembly, and a magnet assembly adapted to generate a magnetic field extending across said substantially annular flow gap, said substantially annular flow gap including a first end positioned adjacent said first chamber and a second end positioned adjacent said second chamber;
laminar flow enhancing means mounted on said piston assembly and positioned adjacent said first and said second ends of said substantially annular flow gap for enhancing laminar flow and minimizing turbulence in said substantially annular flow gap, said laminar flow enhancing means including a respective flow opening positioned adjacent each of said first and said second ends of said substantially annular flow gap, said respective flow opening having a funnel-shaped cross-section defined by an outer annular curved surface extending outwardly from said substantially annular flow gap toward said hollow tube and an inner annular curved surface extending inwardly from said substantially annular flow gap toward a longitudinal axis of said piston core;
at least one non-magnetic end plate; and
a rod connected to one end of said piston assembly, said rod being positioned a spaced distance from said piston core and said at least one non-magnetic end plate being positioned between said rod and said piston core.

12. A damping device, comprising:
a hollow tube containing a magnetorheological fluid;
a piston assembly slidably mounted in said hollow tube to form a first chamber positioned on one side of said piston assembly and a second chamber positioned on an opposite side of said piston assembly, said piston assembly including a piston core, a substantially annular flow gap extending between said first and said second chambers and defining a flow path through the piston assembly, and a magnet assembly adapted to generate a magnetic field extending across said substantially annular flow gap, said substantially annular flow gap including a first end positioned adjacent said first chamber and a second end positioned adjacent said second chamber; and
laminar flow enhancing means mounted on said piston assembly and positioned adjacent said first and said second ends of said substantially annular flow gap for enhancing laminar flow and minimizing turbulence in said substantially annular flow gap, wherein said magnetic assembly includes a flux ring positioned radially between said substantially annular flow gap and said hollow tube, further including flow by-pass channels formed in both said piston core and said flux ring.

13. A damping device, comprising:
a hollow tube containing a magnetorheological fluid;
a piston assembly slidably mounted in said hollow tube to form a first chamber positioned on one side of said piston assembly and a second chamber positioned on an opposite side of said piston assembly, said piston assembly including a piston core, a substantially annular flow gap extending between said first and said second chambers and defining a flow path through the piston assembly, and a magnet assembly adapted to generate a magnetic field extending across said substantially annular flow gap, said substantially annular flow gap including a first end positioned adjacent said first chamber and a second end positioned adjacent said second chamber; and
laminar flow enhancing means mounted on said piston assembly and positioned adjacent said first and said second ends of said substantially annular flow gap for enhancing laminar flow and minimizing turbulence in said substantially annular flow gap, wherein the damping device includes a turn-up ratio of at least approximately 3 at a damper velocity of approximately 1 meter/second.

14. A damping device, comprising:
a hollow tube containing a magnetorheological fluid;
a piston assembly slidably mounted in said hollow tube to form a first chamber positioned on one side of said piston assembly and a second chamber positioned on an opposite side of said piston assembly, said piston assembly including a piston core, a substantially annular flow gap extending between said first and said second chambers and defining a flow path through the piston assembly, and a magnet assembly adapted to generate a magnetic field extending across said substantially annular flow gap, said substantially annular flow gap including a first end positioned adjacent said first chamber and a second end positioned adjacent said second chamber;
a rod operatively connected to said piston assembly;
a first magnetic flux leakage reduction device formed of a non-magnetic material, positioned adjacent said first end of said substantially annular flow gap and securely connected to said piston core, said first magnetic flux leakage reduction device including a first end plate, said rod being connected to said first end plate, said first end plate axially positioned between said rod and said piston core to isolate and position said rod a spaced axial distance from said piston core;
a second magnetic flux leakage reduction device formed of a non-magnetic material, positioned adjacent said second end of said substantially annular flow gap and securely connected to said piston core.

15. The damping device of claim 14, wherein said second magnetic flux leakage reduction device includes a second end plate and said first end plate is connected to said piston core by one of a welded connection and a brazed connection.

16. The damping device of claim 14, wherein said second magnetic flux leakage reduction device includes a second end plate including a nut formed of a non-magnetic material and connected to said piston core, said second plate further including a flat plate positioned between said non-magnetic nut and said piston core, said flat plate and said non-magnetic nut completely covering an outer axial face of said piston core.

17. The damping device of claim 16, wherein said rod and said hollow tube are formed of a non-magnetic material.

18. The damping device of claim 14, further including a piston bearing mounted on said piston assembly and positioned axially along said piston assembly entirely between a center of said piston core and one of said first and said second chambers.

19. The damping device of claim 14, further including a first flow opening positioned at said first end of said substantially annular flow gap and a second flow opening positioned at said second end of said substantially annular flow gap, each of said first and said second flow openings having a funnel-shaped cross-section defined by an outer annular curved surface extending outwardly from said substantially annular flow gap toward said hollow tube and an inner annular curved surface extending inwardly from said substantially annular flow gap toward a longitudinal axis of said piston core.

20. The damping device of claim 19, wherein said second inner magnetic flux leakage reduction device includes a second end plate, said first and said second end plates each including said inner annular curved surface, wherein said magnetic assembly includes a flux ring positioned radially between said substantially annular flow gap and said hollow tube, said outer annular curved surface being formed on said flux ring.

21. A damping device, comprising:
- a hollow tube containing a magnetorheological fluid;
- a piston assembly slidably mounted in said hollow tube to form a first chamber positioned on one side of said piston assembly and a second chamber positioned on an opposite side of said piston assembly, said piston assembly including a piston core, a substantially annular flow gap extending between said first and said second chambers and defining a flow path through the piston assembly, and a magnet assembly adapted to generate a magnetic field extending across said substantially annular flow gap, said substantially annular flow gap including a first end positioned adjacent said first chamber and a second end positioned adjacent said second chamber;
- a rod operatively connected to said piston assembly;
- a first magnetic flux leakage reduction device formed of a non-magnetic material, positioned adjacent said first end of said substantially annular flow gap and securely connected to said piston core; and
- a second magnetic flux leakage reduction device formed of a non-magnetic material, positioned adjacent said second end of said substantially annular flow gap and securely connected to said piston core, said second magnetic flux leakage reduction device completely covering an outer axial face of said piston core.

22. A damping device, comprising:
- a hollow tube containing a magnetorheological fluid;
- a piston assembly slidably mounted in said hollow tube to form a first chamber positioned on one side of said piston assembly and a second chamber positioned on an opposite side of said piston assembly, said piston assembly including a piston core, a substantially annular flow gap extending between said first and said second chambers and defining a flow path through the piston assembly, and a magnet assembly adapted to generate a magnetic field extending across said substantially annular flow gap, said substantially annular flow gap including a first end positioned adjacent said first chamber and a second end positioned adjacent said second chamber;
- a rod operatively connected to said piston assembly;
- a first magnetic flux leakage reduction device formed of a non-magnetic material, positioned adjacent said first end of said substantially annular flow gap and securely connected to said piston core; and
- a second magnetic flux leakage reduction device formed of a non-magnetic material, positioned adjacent said second end of said substantially annular flow gap and securely connected to said piston core, said second magnetic flux leakage reduction device completely covering an outer axial face of said piston core, wherein said second magnetic flux leakage reduction device includes a second end plate including a nut formed of a non-magnetic material and connected to said piston core, said second plate further including a flat plate positioned between said non-magnetic nut and said piston core, further including an inner annular curved surface formed on said non-magnetic nut for smoothly guiding fluid flow into and out of said substantially annular flow gap.

* * * * *